United States Patent [19]

Rogers

[11] 3,927,451
[45] Dec. 23, 1975

[54] METHODS OF FITTING FLUID PRESSURE OPERATED DEVICES INTO PIPELINES

[75] Inventor: Ivor Thomas Rogers, Luton, England

[73] Assignee: George Kent, Limited, Luton, England

[22] Filed: June 24, 1974

[21] Appl. No.: 481,986

[30] Foreign Application Priority Data
July 5, 1973 United Kingdom............... 32193/73

[52] U.S. Cl.................... 29/157 R; 29/428; 285/30; 285/31; 403/286; 403/292
[51] Int. Cl.²......................................... B21D 39/03
[58] Field of Search ............ 29/428, 433, 445, 464, 29/468, 526, 157 R, 630 F; 73/201; 285/18, 25, 28, 30, 31, 131; 220/3.2; 333/98 R; 403/286, 287, 292 S

[56] References Cited
UNITED STATES PATENTS
3,756,628   9/1973   St. Clair........................... 285/30 X FOREIGN PATENTS OR APPLICATIONS
15,356   7/1912   United Kingdom.................. 285/31
686,210   12/1939   Germany .............................. 285/31
714,913   9/1954   United Kingdom................... 73/201

*Primary Examiner*—C. W. Lanham
*Assistant Examiner*—Joseph A. Walkowski
*Attorney, Agent, or Firm*—Burgess Ryan and Wayne

[57] ABSTRACT

The method of fitting a fluid pressure operated device in a pipeline comprises the steps of removing a straight section of the pipeline of length less than the fluid pressure device to afford spaced coaxial pipeline ends, mounting union couplings on the pipeline ends, mounting annular sealing means inwardly of the couplings, substantially tilting the axis of the device relatively to the pipeline and passing an inlet or outlet connection of the device on to the pipeline to an extent to enable the device connections to be brought into a position coaxial with the pipeline, moving the device into the coaxial position with the device connections extending over the respective ends of the pipeline, and, tightening the union couplings on to the inlet and outlet connections of the device thereby to clamp the sealing means between each coupling and the device to provide a seal between each device connection and the pipeline.

3 Claims, 5 Drawing Figures

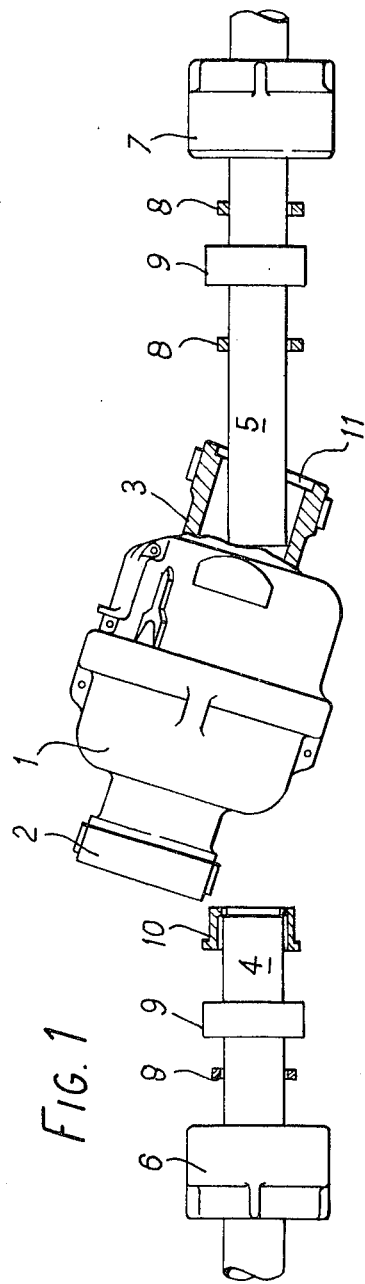
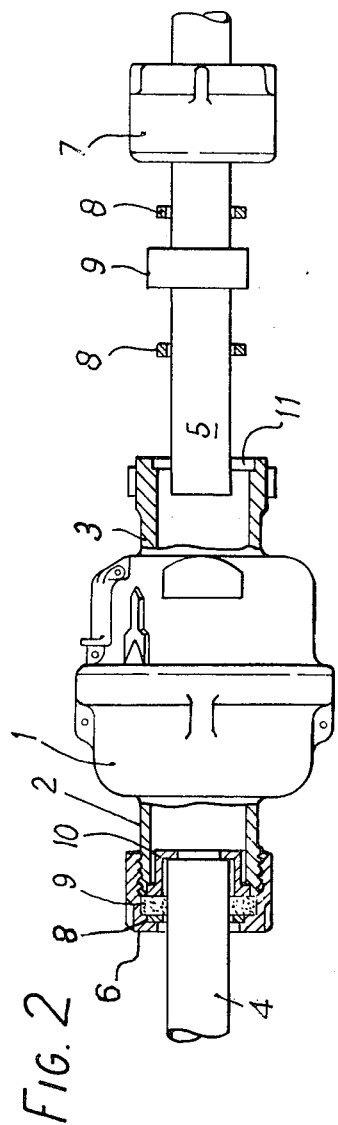

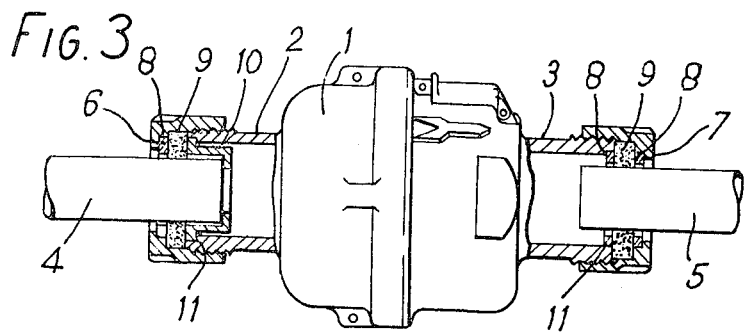
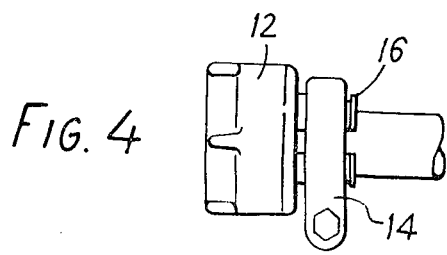
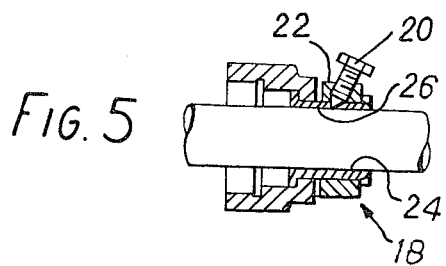

ns to be brought into a
METHODS OF FITTING FLUID PRESSURE OPERATED DEVICES INTO PIPELINES THIS INVENTION relates to methods of fitting fluid pressure operated devices into pipelines.

It is an object of the invention to provide an improved method of fitting a fluid pressure operated device into a pipeline according to which the fitting of the device where space is limited, for example, where the pipeline extends closely alongside a wall, is facilitated.

The present invention consists in the method of fitting a fluid pressure operated device into a pipeline the device having coaxial inlet and outlet connections of substantially larger internal diameter than the external diameter of the pipeline, which comprises the steps of removing a straight section of the pipeline of length less than the overall length of the fluid pressure device to afford spaced coaxial pipeline ends between which the device is to be fitted; mounting union couplings on the respective ends of the pipeline; mounting annular sealing means on each end of the pipeline inwardly of the associated union coupling; by substantial tilting of the axis of the device connections relatively to the pipeline axis, passing one of the inlet or outlet connections of the device on to an end of the pipeline to an extent as to enable the device connections to be brought into a position coaxial with the pipeline; moving the device into said coaxial position; moving the device coaxially with respect to the pipeline to a position in which both inlet and outlet connections of the device extend over the respective ends of the pipeline; and tightening the annular couplings on to the inlet and outlet connections respectively of the device, thereby to clamp the sealing means between each coupling and the device so as to afford a seal between each connection of the device and the associated pipeline end.

It will be appreciated that by virtue of the inlet and outlet connections of the device having a substantially larger internal diameter than the external diameter of the pipeline, the device can be fitted over one of the pipeline ends whilst at a substantial inclination to the axis of the pipeline. Accordingly, fitting of the device into a pipeline in confined conditions, for example, where the pipeline is located near a wall or a floor, is facilitated.

The invention will now be described, by way of example, with reference to the accompanying drawings, in which:

FIGS. 1 to 3 are side elevations partly in section showing progressively the fitting of a fluid pressure operated device into a pipeline end, and, FIGS. 4 and 5 show alternative details.

Referring first to FIGS. 1 to 3, a water meter 1 has inlet and outlet connections 2 and 3 for connection to respective coaxial ends 4 and 5 of a pipeline.

Union couplings 6 and 7 are respectively mounted on the pipeline ends 4 and 5 which ends are spaced apart by a distance somewhat smaller than the overall axial dimensions of the water meter as measured along the axis of the inlet and outlet thereof. Inwardly of each of the coupling 6 slipped on the pipeline end 4 are packing rings 8 and 10 between which is disposed sealing ring 9. Similarly, on pipeline end 5 are slipped two packing rings 8 with sealing ring 9 therebetween.

Internally the diameter of the inlet and outlet connections 2 and 3 appreciably exceeds the overall diameter of the pipeline ends 4 and 5 enabling, as shown in FIG. 1, the water meter to be tilted with the axis of its inlet and outlet at a substantial angle to the pipeline axis. In this position, the outlet 3 is slipped over the pipe end 5 to an extent sufficient to enable movement of the inlet 2 of the water meter into a position between the pipe ends so that the axis of the inlet and outlet 2 and 3 is coaxial with that of the pipe ends 4 and 5. From this position, the water meter is moved towards the pipe end 4 until both inlet and outlet 2 and 3 are respectively disposed around pipe ends 4 and 5. The union couplings are then tightened on to the inlet and outlet of the water meter thereby clamping the sealing rings 9 and packing rings 8 and 10 to provide a seal between the pipe ends and the water meter connections. The clamping of rings 8, 9 and 10 is between the union couplings and a shoulder 11 provided interiorly at each of the inlet and outlet connections of the water meter. The packing rings employed in the design ensure that correct centralisation of each pipe end within its associated meter connection takes place thereby to achieve a good seal and produce rigidity within the connection.

It will be appreciated that by providing rings 8, 9 and 10 of different internal diameters, the possibility is afforded of fitting the water meter to varying diameters of pipeline.

In order to install the meter in an existing pipeline, a section of pipeline shorter than the overall length of the meter measured along the axis of its inlet and outlet connections is removed, the couplings 6 and 7 are mounted on the pipeline ends and thereafter the rings 8, 9 and 10 are mounted inwardly of the couplings. The meter is then located as described above and illustrated in FIGS. 1 to 3, coaxially with the pipeline, whereupon the couplings 6 and 7 are tightened.

FIG. 4 illustrates an alternative coupling 12 to couplings 6 and 7 to that shown in the earlier figures which is provided with a locking ring 14 such as a jubilee clip for clamping and outer bifurcated end 16 of the coupling to the pipeline in the tightened position of the coupling on the meter. This form of coupling is advantageously used where the meter is fitted in a plastic pipeline. A further alternative form of coupling 18 is shown in FIG. 5 where locking of the coupling 6 or 7 is afforded by a grub screw 20 extending through a ring 22 to engage the outer surface of the pipeline. It will be noted that the outer sealing ring 24 (equivalent of outer sealing ring 8 of FIGS. 1 to 3) is formed with an axial extension 26 through which the grub screw 20 penetrates. The arrangement of FIG. 5 is used in conjunction with metal pipelines.

It will be appreciated that the method of the invention is applicable to the installation in a pipeline of fluid pressure operated devices generally, whether gaseous pressure operated or liquid pressure operated, and not confined to water meters.

I claim:

1. The method of fitting a fluid pressure operated device into a pipeline the device having coaxial inlet and outlet connections of substantially larger internal diameter than the external diameter of the pipeline, which comprises the steps of removing a straight section of the pipeline of length less than the overall length of the fluid pressure device to afford spaced coaxial pipeline ends between which the device is to be fitted; mounting union couplings on the respective ends of the pipeline; mounting annular sealing means on each end of the pipeline inwardly of the associated union coupling; tilting the axis of the device connections to a substantial extent relatively to the pipeline axis, passing one of the inlet or outlet connections of the device on to an end of the pipeline to an extent as to enable the device connections to be brought into a position coaxial with the pipeline; moving the device into said coaxial position; moving the device coaxially with respect to the pipeline to a position in which both inlet and outlet connections of the device extend over the respective ends of the pipeline; and tightening the annular couplings on to the inlet and outlet connections respectively of the device, thereby to clamp the sealing means between each coupling and the device so as to afford a seal between each connection of the device and the associated pipeline end.

2. The method claimed in claim 1 which includes clamping to the pipeline the union couplings each at the side thereof remote from the device.

3. The method claimed in claim 1 which includes employing annular sealing means of different internal diameter to enable fitting of the device to different sizes of pipeline.

* * * * *